United States Patent [19]

Fischer et al.

[11] Patent Number: 5,691,829
[45] Date of Patent: Nov. 25, 1997

[54] METHOD FOR FIXING OPTICAL INFORMATION IN CRYSTALS AND FOR QUASI-PHASE MATCHING IN FREQUENCY MIXING

[75] Inventors: Baruch Fischer; Moshe Horowitz, both of Haifa, Israel

[73] Assignee: Technion Research & Development Foundation Ltd., Haifa, Israel

[21] Appl. No.: 543,883

[22] Filed: Oct. 17, 1995

Related U.S. Application Data

[63] Continuation of Ser. No. 207,062, Mar. 8, 1994, abandoned.
[51] Int. Cl.[6] .................... G03H 1/02; G03H 1/22; G02F 1/35
[52] U.S. Cl. .................. 359/7; 359/32; 359/328
[58] Field of Search ................ 359/7, 328, 10, 359/11, 32

[56] References Cited

U.S. PATENT DOCUMENTS

| | | |
|---|---|---|
| 4,138,189 | 2/1979 | Huignard et al. ............... 359/7 |
| 4,907,850 | 3/1990 | Araki et al. .................. 359/328 |
| 4,953,924 | 9/1990 | Redfield et al. ............... 359/7 |
| 5,202,891 | 4/1993 | Sleight et al. ................ 359/328 |

*Primary Examiner*—Paul M. Dzierzynski
*Assistant Examiner*—Audrey Chang
*Attorney, Agent, or Firm*—Edward Langer

[57] ABSTRACT

A method and apparatus for fixing images, holograms and domain gratings in crystals by application of an electric field on a crystal and simultaneous illumination of it with a light pattern. The fixing procedure is based on a screening effect. The modulation of the domains may be perpendicular to the c-axis. Another application of the method is in frequency mixing such as second harmonic generation and parametric processes, by overcoming the problem of phase matching using the domain gratings. Thus, it is possible to obtain controllable broadband mixing and tailored quasi-phase matching for several wavelengths or for prespecified wavelength tuning ranges and frequency widths.

16 Claims, 8 Drawing Sheets

METHOD FOR FIXING OPTICAL INFORMATION IN CRYSTALS AND FOR QUASI-PHASE MATCHING IN FREQUENCY MIXING

This is a continuation of application Ser. No. 08/207,026 filed on Mar. 8, 1994, now abandoned.

FIELD OF THE INVENTION

The present invention relates to methods for storage of information in crystal media, and more particularly, to the application of light patterns and electric fields to crystals to induce controllable domain structures for optical information storage and controllable quasi-phase matching for frequency mixing, as for second harmonic generation (SHG).

BACKGROUND OF THE INVENTION

It is known that certain crystals can serve as a potential storage media for information, and new methods for fixing of images and their holograms in crystals can be a most important drive for new optical image processing and memory applications. The presently available methods are limited and their repeatability and effectiveness for long times are not clear. These known methods are based on use of photorefractive crystals, as described in the references by F. Micheron et al., Appl. Opt. 13, 784 (1974), F. Micheron and G. Bismuth, Appl. Phys. Lett. 13, 71 (1973), and 0. Amodei et al., Appl. Opt. 11, 784 (1972).

A known method described in the first two of the above papers utilizes the photorefractive effect for fixing the image in the crystal, and is accomplished by applying an external field in the crystal in a direction opposite to its polarization. The applied field is added to the local space charge field induced by the light fringe pattern, of which the wavevector (modulation direction) is approximately parallel to the crystal c-axis. Then, if the field is slightly smaller than the macroscopic coercive field, the local space charge field causes a partial switching of the polarization in regions where the internal field is constructively added to the applied field. The obtained spontaneous polarization has a modulation direction predominantly along the c-axis. The procedure can be performed at room temperatures or close to or above the phase transition temperature (in the last case the external field might be unnecessary).

The photorefractive methods use crystals such as $Sr_x Ba_{1-x} Nb_2 O_6$ (SBN), $BaTiO_3$ and LiNbO which are ferroelectric crystals, which under suitable temperature and poling conditions, have well-defined ferroelectric polarization directions. The photorefractive effect relies on the development of an internal space charge electric field built by light induced charge separation. Large alternating fields on the order of kV/cm and periods between submicrometers and tens of micrometers can be easily induced.

As described above, while it is known to apply the photorefractive effect to replicate a light pattern in a crystal, these patterns have not been proven to be permanent, and have other basic limitations as described below, preventing their use as an information storage medium.

Therefore, it would be desirable to provide a method and apparatus for fixing images in crystals, for use as information storage media.

Second harmonic generation (SHG) enables doubling the beam frequency, producing half the wavelength. The problem with achieving this application is a basic limitation associated with phase matching, between the fundamental and the second harmonic waves, which is usually not met due to dispersion. The most common method to overcome the phase matching problem is to use crystal birefringence. However, this and other similar solutions restrict the frequency range in which the harmonic generation can be obtained. For example, the method cannot be used in SBN crystals in wavelengths below approximately 3 µm for x=0.75 and approximately 2 µm for x=0.61, due to the relatively small birefringence of the crystal ($\Delta n$ approximately 0.012 for x=0.75 and $\Delta n$ approximately 0.029 for x=0.61 at wavelengths around 0.83 µm, where the dispersion gives $\Delta n$ approximately 0.2). No reported experimental study of SHG with SBN crystals has been discovered by the present inventors.

Another way to solve the phase matching problem is by quasi-phase matching with an "artificial" spatial modulation of the optical nonlinearity. Such a modulation was produced $LiNbO3$ and other crystals by a periodic changing of the crystal orientation during their growth, as described in the paper by A. Feisst et al., Appl. Phys. Lett., 47, 1125 (1985), or by other irreversible techniques, as described in the papers by M. L. Bortz et al., Opt. Lett. 17, 704 (1992), K. Yamamoto et al., Opt. Lett. 16, 1156 (1991) and K. Shinozaki et al., Appl. Phys. Lett. 58, 1934 (1991). Again, this only provides SHG for a specific input wavelength.

Therefore, it would be desirable to provide a method for controllable SHG, for a broad range of input wavelengths, without angular or temperature tuning of the crystal.

SUMMARY OF THE INVENTION

Accordingly, it is a principal object of the present invention to overcome the disadvantages of prior art photorefractive techniques and provide a method and apparatus for fixing images, holograms and domain gratings in crystals by application of an electric field on a crystal and simultaneous illumination of it with a light pattern.

In accordance with a preferred method of the present invention, there is provided a method for reversibly fixing optical images and holograms in a crystal having a predefined polarization, said method comprising the steps of:

projecting on the crystal a first input light pattern comprising an image or hologram;

applying, simultaneous with said projecting step, a voltage to the crystal along the c-axis thereof, to induce an internal electric field pattern therein;

blocking said first input light pattern; and applying a second voltage with polarity opposite to said voltage, such that ferroelectric domains are induced and said first input light pattern is permanently fixed in said crystal until erased by application of an electric field thereto simultaneous with a second input light pattern.

In the preferred embodiment, the image fixing procedure uses an applied electric field on the crystal and simultaneous illumination by a light pattern. It is believed that due to a screening effect by photo-ionized charges caused by the light pattern, an internal electric field pattern is formed, and domain patterns, images or gratings, are developed. The modulation of the domains may be perpendicular to the c-axis. The method has been used to demonstrate direct image and hologram recordings.

The method is basically different from prior art methods in the following ways:

1) the use of screening for replicating light patterns like images and gratings in the crystal. The screening affects or cancels an applied electric field for domain inversion;

2) the induced domain gratings can have an unusual grating vector direction (modulation direction) perpendicular to the c-axis, with periodicities as short as on the order of 1 µm. In the previous methods that rely on photorefractively induced internal fields in the crystal, the domain modulation direction has a significant component along the c-axis, thus giving a longitudinal (non-transverse) domain grating. Therefore, these methods have an inherent limitation due to the built-in depolarization electrostatic energy in the domain walls, since $$\nabla \cdot \bar{P} \neq 0$$

(where $\bar{P}$ is the spontaneous polarization) between successive antiparallel domains. This limits the long-term stability of the domain structures, especially for short grating periods. In the inventive method, the use of screening enables the possibility of "transverse" domain gratings, where the polarization directions are perpendicular to the modulation, and the domain walls depolarization energy is eliminated ($\nabla \cdot \neq 0$);

3) non-photorefractive crystals can be used for fixing; and 4) simultaneous application of the external field and the light on the crystal enable storage of many different holograms small separate regions in the crystal, and each hologram can be separately stored or erased in the crystal in a few seconds without significantly affecting other holograms which were previously stored in the crystal.

Another application of the inventive technique frequency mixing such as parametric processes and second harmonic generation, enabling mixing of frequencies in the crystal while overcoming the problem of phase matching. Thus, it is possible to 1) obtain a controllable spread spectrum of the domain grating which enables obtaining broadband parametric frequency mixing such as second harmonic generation; and 2) obtain tailored quasi-phase matching for several wavelengths or for prespecified wavelength tuning ranges and frequency widths.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding sections throughout, and in which:

FIGS. 2a–d show, respectively, images formed in the crystal of the optical arrangement of FIG. 1a;

FIGS. 2e–g show, respectively, holographic images fixed in the crystal of the optical arrangement of FIG. 1a;

DETAILED DESCRIPTION OF THE PREFERRED EMBODIMENTS

Figure 1A:
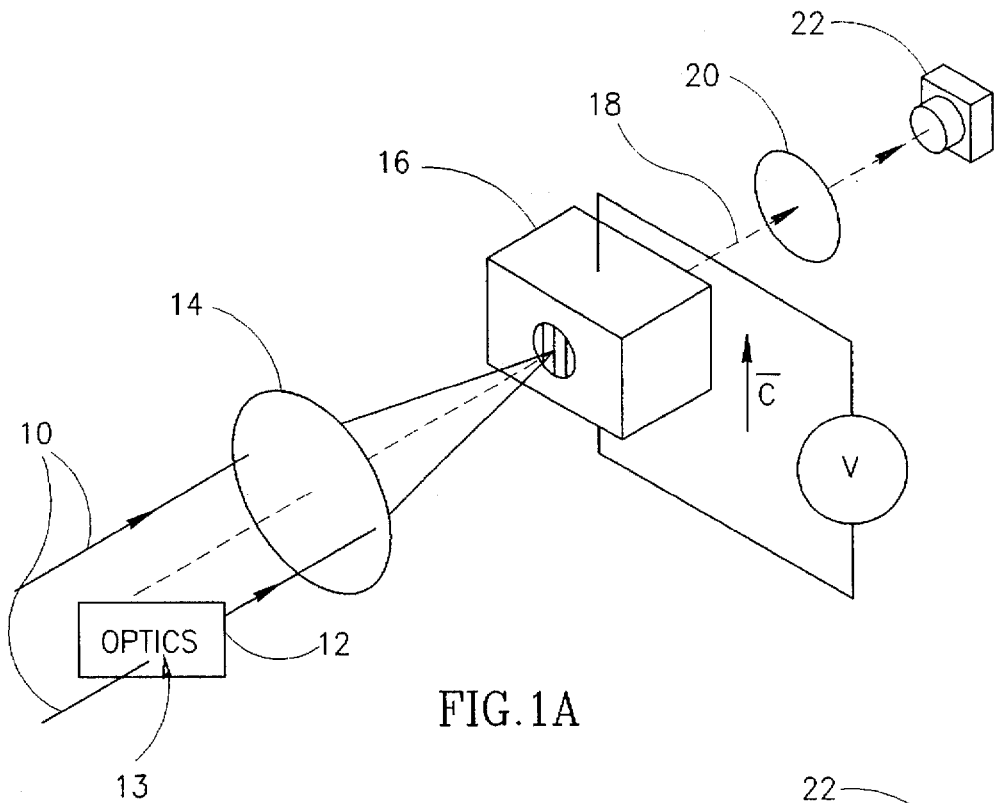
FIG. 1a is a schematic diagram of an optical arrangement for a method of fixing an image or hologram in a crystal in accordance with the principles of the present invention.
Figure 1B:
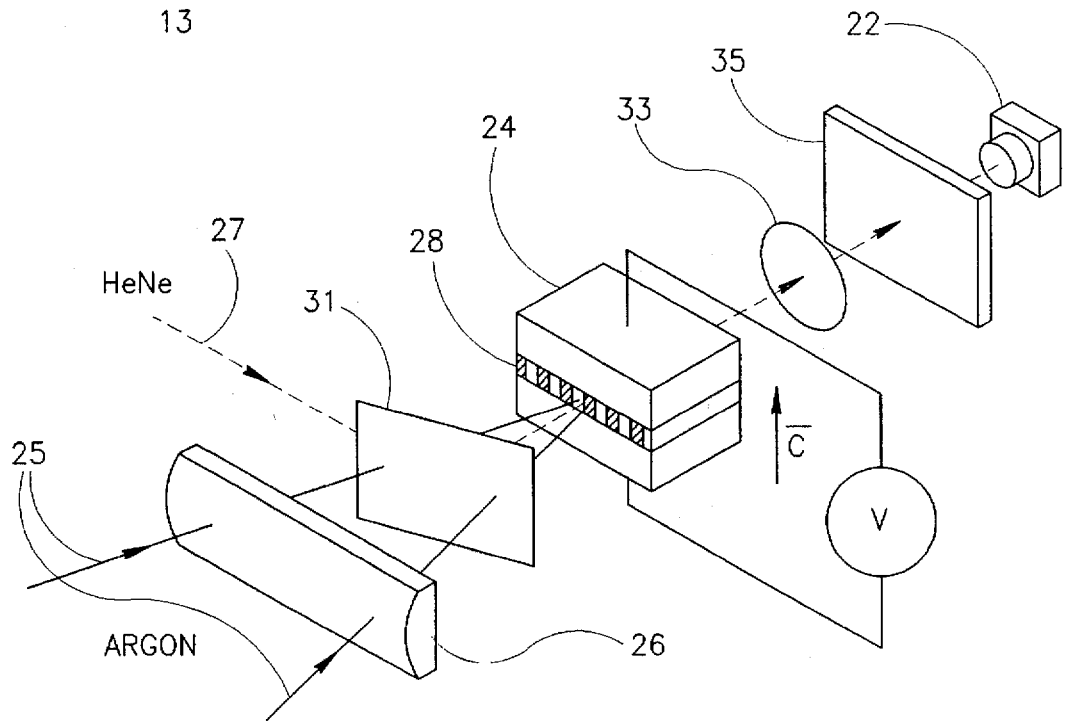
FIG. 1b is a schematic diagram of an optical arrangement for a method of fixing a domain structure in a crystal in accordance with the present invention.

Referring now to FIGS. 1a–b, there are shown optical arrangements which were used for fixing information in a crystal in accordance with the method of the present invention. The optical arrangement of FIG. 1a comprises writing light beams 10, produced by an Argon ion laser, having a wavelength of 514.5 nm, an extraordinary polarization and powers of tens of mW. The beam was passed through a transparent slide 12 having the word "optics" printed thereon, representing image pattern information 13, and the beam was then focused by a lens 14. The crystal 16 was a poled $Sr_{0.75}Ba_{0.25}Nb_2O_6$ type crystal. In one case, crystal 16 was undoped without a pronounced photorefractivity, with dimensions of 5 cubic millimeters. In a second case, crystal 16 was nominally doped with 0.05 wt. % Ce, was strongly photorefractive, with dimensions of 6×6×1 mm$^3$ and a c-axis along one of the 6 mm sides. The output beam 18 was focused via lens 20 and photographed by camera 22.

The experimental data obtained in this arrangement was obtained with the second crystal. SBN is a very popular photorefractive medium due to its large electro-opto coefficient, and its invulnerabillty when high electric fields are applied to the crystal. In the direct image recording, only one Argon ion laser beam was used and an image was projected on the crystal by lens 14. The fixing caused permanent phase patterns in the crystal 16 according to the input light patterns. In the hologram fixing experiment, another reference beam was used to form the interference with the image-carrying beam. The crystal 16 was located close to the Fourier plane of the image 13.

In both cases (direct image and hologram recordings), the fixing was carried out in two stages: First, an external voltage (V) was applied along the c-axis with a polarity opposite to that used to polarize the crystal (it was noticed, however, that the same voltage polarity as that used to polarize the crystal can also be used along the c-axis). The voltage was gradually increased from 500V to 2 kV in 10–15 seconds until a phase distortion was seen on the image beam after it passed crystal 16. The needed strength and duration of the applied voltage was shorter as the intensity of the input light was higher. Then, writing beams 10 were blocked and the polarity of the applied voltage (V) was inverted. The voltage on crystal 16 was raised from 0 to 800 V in 5 seconds and then disconnected.

During the reconstruction of the information a weak voltage (approx. 1000V) was applied, in order to increase the efficiency. This voltage caused an immediate growth in the intensity of the reconstructed image. After the fixing was performed, no significant change in the visibility of the reconstructed image was seen after illuminating crystal 16 for 1 hour with an Argon ion laser beam having an intensity of 20 mW/mm2, turning off the illumination for a 12 hour period and repeating the illumination of crystal 16 for another hour. The fixing in a specific volume of crystal 16 could be erased by illuminating it with a 20 mW Argon ion laser beam, while applying an external voltage of 2.0 kV for approximately 15 seconds.

In the first part of the experiments, an image 13 was stored in crystal 16. After the fixing, beam 10 which contained image 13 was blocked and the fixed image was observed by a Gaussian probe laser beam (HeNe). The fixing process created changes in crystal 16 which resulted in spatial modulation of the phase of the probe beam. In order to observe these changes, the camera 22 was placed slightly out of the image plane of crystal 16, so that the phase structure was converted into an intensity pattern. In the same manner, the phase pattern could be seen by illuminating crystal 16 with a white light instead of the laser beam.

Figure 2A:
Figure 2B:
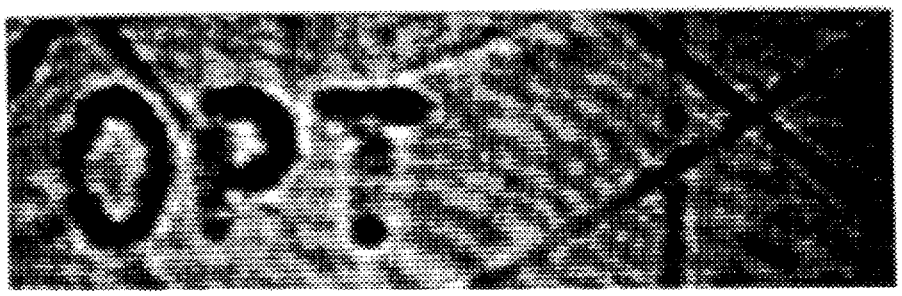
Figure 2C:
Figure 2D:

FIGS. 2a–d show an image (FIG. 2a), which is a portion ("opt") of original image 13, and the reconstructed image (FIG. 2b). The size of the image diameter in the surface of crystal 16 was about 100 µm. However, smaller or larger image sizes could be stored. The fixing process was observed to cause significant changes in the crystal structure only in the regions which were illuminated during the time that the external field was applied. This property was used to store another image (portion "ics"), after the first image was stored, in a different location of the crystal (by spatial multiplexing, FIG. 2c). The new image was added to crystal 16 by projecting portion "ics" of image 13 on the desired location and performing the fixing process as described above. No significant degradation of the reconstruction quality of the first image was observed after the fixing of the second image (shown combined in FIG. 2d).

In the hologram fixing experiments, the interference of the image-carrying beam was recorded with a reference beam which had a diameter of 1 mm. The grating vector of the fringe pattern was approximately normal to the c-axis (unlike the reference by F. Micheron et al., supra). Then, the space charge field built in the photorefractive process was approximately perpendicular to the applied field. The wavelength of the grating was around 2 µm. However, holograms with smaller wavelengths could be fixed. Prior to the fixing step, a very weak diffraction of the reference beam was observed in the direction of the signal beam, when the input beams had extraordinary polarizations. It is believed that this coupling is due to the photogalvanic effect, as described in the book by E. M. Lines et al, Principle and Applications of Ferroelectrics and Related Materials (Oxford Science, London 1917) and the paper by A. Gnatovskii et al, "Photorefractive Materials, Effects and Devices" (Optical Society of America, Vol. 14, 150, 1991). No diffraction could be seen when the input beams had ordinary polarizations.

Figure 2E:
Figure 2F:
Figure 2G:
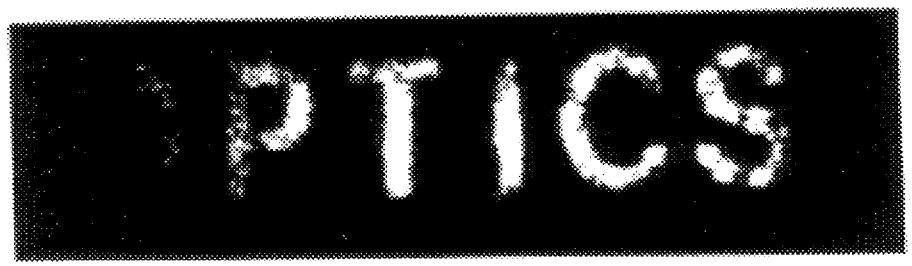

After performing the fixing process, the signal beam was blocked and the reconstructed image could be seen. The original image is shown in FIG. 2e, and the reconstructed image is shown in FIG. 2f. The diffraction efficiency in this case was about 1% (for a crystal width of 1 mm. No significant change in the reconstructed image was observed after the following steps: one hour of illumination by a 20 mW Argon ion laser beam; 12 hours without input light; and illumination of crystal 16 for another hour. FIG. 2g shows the reconstructed image after these steps.

When the fixed hologram was read with a reference beam with an ordinary polarization, a small diffraction (with the reconstructed image) of the reference beam was observed immediately after the fixing. However, it almost disappeared after a few seconds. It could be seen again for a short time if a strong external voltage was applied (1.5 kV), but this strong voltage caused the erasure of the fixed hologram.

In accordance with the principles of the present invention, it is possible to store two holograms in different locations of crystal 16. However, when the fringe gratings had small wavelengths, (approx. 2 µm), a significant decrease in the reconstruction efficiency of the hologram which was first stored, unless strong light powers were used for the fixing (approx. 150 mW). In this case, the voltage needed for the first stage of the fixing process was less than 1 kV. High applied voltages on the crystal (>1.5 kV) caused the erasure of holograms with small grating wavelengths even without illumination.

Many holograms were stored in different locations of crystal 16 (by spatial multiplexing) by repeating the first stage of the fixing process for each hologram separately, without changing the polarity of the applied voltage. Then, the second stage of the process was performed in which all of the holograms were simultaneously fixed, without any mutual damaging effect of the different holograms. This fixing could be obtained with low light power.

It is also possible to use angular multiplexing where each hologram is recorded by varying the angle of the image-carrying beam, the reference beam, or the orientation of crystal 16. It is also possible to use wavelength multiplexing, where each hologram or image is written with a different wavelength.

Holograms could also be stored with grating vectors which are approximately parallel to the c-axis. In this case, high diffraction efficiencies were observed for gratings with long wavelengths (>10 µm). However, gratings with wavelengths of about 2 µm resulted in low diffraction efficiencies (approx. 0.15%). The diffraction efficiency could be enhanced temporarily by applying a strong voltage to the crystal, but this caused the erasure of the stored hologram after a few seconds.

While not wishing to be bound by theory, it is believed by the inventors that the fixing is based on screening. The applied field is screened in regions with strong light intensities by the charge separation enabled by the photo-ionized charges. The screening produces strong internal fields which cause non-uniform distribution of the applied voltage. These fields, which follow the light intensity pattern, result in a non-uniform inversion of the spontaneous polarization. Even after turning off the voltage which was applied simultaneously with the light pattern, the strong internal field may cause domain inversions.

The indications that the fixing mechanism is based on screening are the following:

1) Good fixing was obtained when crystal 16 was a type without a pronounced photorefractivity. Moreover, the fixing was obtained for direct images which were projected on crystal 16 where only one beam illuminated crystal 16 and the light intensity gradients were low. Then, the standard photorefractive effect is very weak;

2) Holograms were stored with wavevectors which are approximately perpendicular to the applied fields. In these cases, the standard space charge photorefractive field is normal to the applied field so that it cannot trigger domain inversions;

3) When the light illuminated a layer in crystal 16 which was parallel to the applied field, there was no observed change in crystal 16 after the fixing process. The screening effect is simply not effective in this case.

However, when the light layer was normal to the applied field a strong fixing was achieved and a strong phase distortion was seen in the layer region.

In fact, a weak fixing could be achieved in this case even without the use of external fields if the power of the incident light was above 100 mW (the width of the layer was approx. 0.2 mm). The reason is that crystal 16 is heated up by the light to a temperature near the phase transition temperature. This temperature (45 deg. C) is close to the room temperature in SBN crystals (x=0.75), where the coercive field is negligible and the internal photogalvanic field becomes sufficient for inducing domain inversions. This property can be used to obtain fixing without applying external fields. This type of fixing has been reported in a paper by Thaxter et al., Appl. Opt. 11, 784 (1974).

In accordance with the principles of the present invention, the basic idea for using controllable methods to induce a periodic domain structure is also applicable to obtaining the required phase matching for second harmonic generation. The fact that the required phase matching period, which is on the order of a few μm (imposed by the dispersion), matches the optimal range for photorefractively induced gratings in common crystals is a very advantageous starting point. For that purpose, a similar procedure has been developed for inducing periodic and pseudo-random ferroelectric domain structures in photorefractive SBN crystals.

In the experimental setup of the optical arrangement of FIG. 1b, an interference pattern was formed in a crystal 24. The period of the interference pattern was dependent on the angle between two mutually coherent beams 25 of equal intensities (5 to 100 mW) derived from an Argon ion laser with a wavelength of 514.5 nm. The crystals used were polarized types SBN crystals of 5 mm$^3$ with characteristics x=0.61 and x=0.75 and a nominal doping of 0.1 wt % and 0.05 wt % Ce. The beams 25, of ordinary polarization were focused into crystal 24 via a cylindrical lens 26 (f=8 cm) giving an illuminated light layer 28 of about 30 μm thickness in crystal 24 in the beams plane, which is perpendicular to the c-axis (FIG. 1b). An external voltage (V) was applied along the c-axis with a polarity opposite that used to polarize crystal 24, and this voltage was gradually increased from 0 to 2 kV in 5 to 30 sec. The voltage corresponding to the coercive field was approximately 1.2 kV. The fixing process was probed by a 1 mW HeNe laser beam 27 with an input polarization at 45 degrees with the c-axis, which is inputted via beam splitter 31. In order to notice changes in the polarization due to the domains, crystal 24 was monitored through a lens 33 and a red filter and polarizer 35 with an axis perpendicular with respect to the input polarization.

Figure 2H:
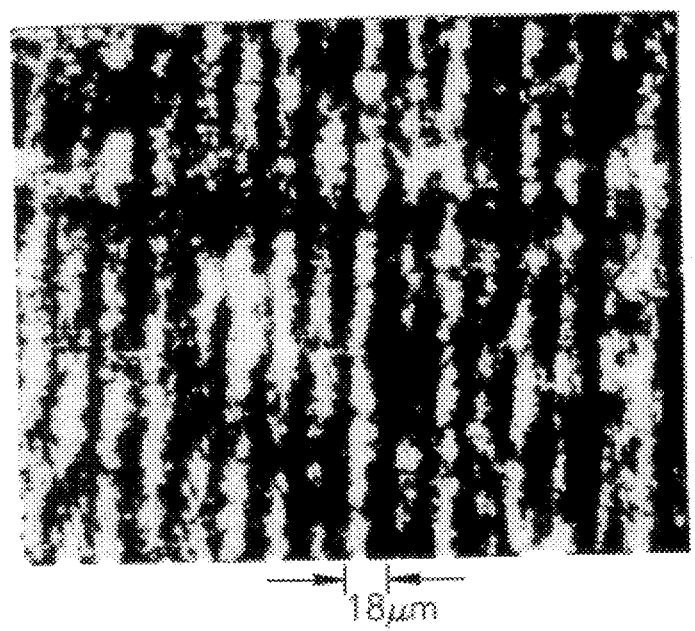
FIGS. 2h–i show, respectively, ordered and pseudorandom domain structures formed in the crystal of the optical arrangement of FIG. 1b.

When an auxiliary voltage of 300 V was applied to crystal 24, a domain structure was observed, as shown in FIG. 2h. The horizontal dark line in the figure is the region of the Argon ion light layer 28. The domain structure spread over most of the crystal's volume due to this seed layer. The spatial modulation was in the direction perpendicular to the c-axis. The periodicity in FIG. 2h was 18 μm. This periodicity, however, was controllable by changing the angle between the two Argon ion laser beams 25 which were used in the fixing method. By control of the periodicity, it was lowered to approximately 1.5 μm. Successive domains were anti-parallel (180 degree type), evident from the fact that in the SHG experiment described below, no significant conversion was noticed when the pump wave propagated along the c-axis. SHG was observed for light propagation along one of the other principal axes.

Figure 2I:
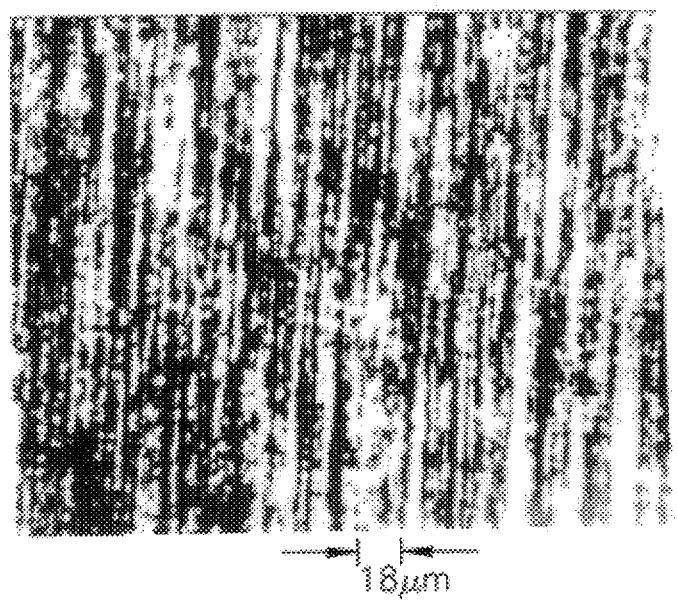

In addition to the ordered domains, pseudo-random domains in the same crystal 24 were observed, as shown in FIG. 2i. These domains can be obtained even with one Argon ion beam that produces the light layer 28 in crystal 24. This non-uniform structure is attributed to a non-uniform voltage drop in the layer due to fluctuations in the light intensity. The domains were elongated boxes with a two dimensional modulation, having a spread range of widths, and an orientation along the c-axis. The cross-section sizes were distributed around the order of a few μm.

In the book entitled "Ferroelectric Crystals for Laser Radiation Control", A. Prokhorov and S. Kuzminov, Adam Higler IOP Pub., England (1990), there is a report on $Ba_2NaNb_5O_{15}$ (BNN) crystals with micro domains, obtained in the growing stage, while attempts to grow micro domains in SBN failed. Here it is seen that such micro domains can be produced, changed and controlled in a grown SBN crystal. It was possible to erase the ordered domains and the micro domains by a gradual cooling of crystal 24 from above the para-ferroelectric phase transition temperature (45 deg. C and 80 deg. C for SBN with x=0.75 and x=0.61 respectively), while applying an external field (5 kV/cm) and shining the crystal with a 100 mW Argon ion laser beam to compensate the depolarization field by the excited carriers.

In the broadband second harmonic generation experiment, crystal 24 was illuminated with a pulsed Ti-Sapphire laser (Continuum Inc. model TS60). The pulses had a duration of 10 nsec, a repetition rate of 10 Hz and an average energy of about 40 mJ. However, most of the experimental data was taken with more moderate energies of 1–10 mJ. When the "treated" crystal 24 was illuminated in the region with the fixing, a strong second harmonic generation was generated. The pump beam had an extraordinary or ordinary polarization and propagated in one of the two main axes which are perpendicular to the c-axis (in parallel or in perpendicular to the direction of the ordered grating modulation).

The SHG, however, always had an extraordinary polarization. It had a far field spread in a direction perpendicular to the plane which contained the incident wave and the c-axis. The angular spread was about 8 degrees. An angular spread of SHG was also reported for a BNN crystal with grown micro domains, per the book by Prokhorov et al., supra. In the present experiment, the SHG was observed for input wavelengths in the range between 750 nm to 910 nm with the Ti:Sapphire laser and at 1064 nm with the pump Nd:Yag laser.

Figure 3A:
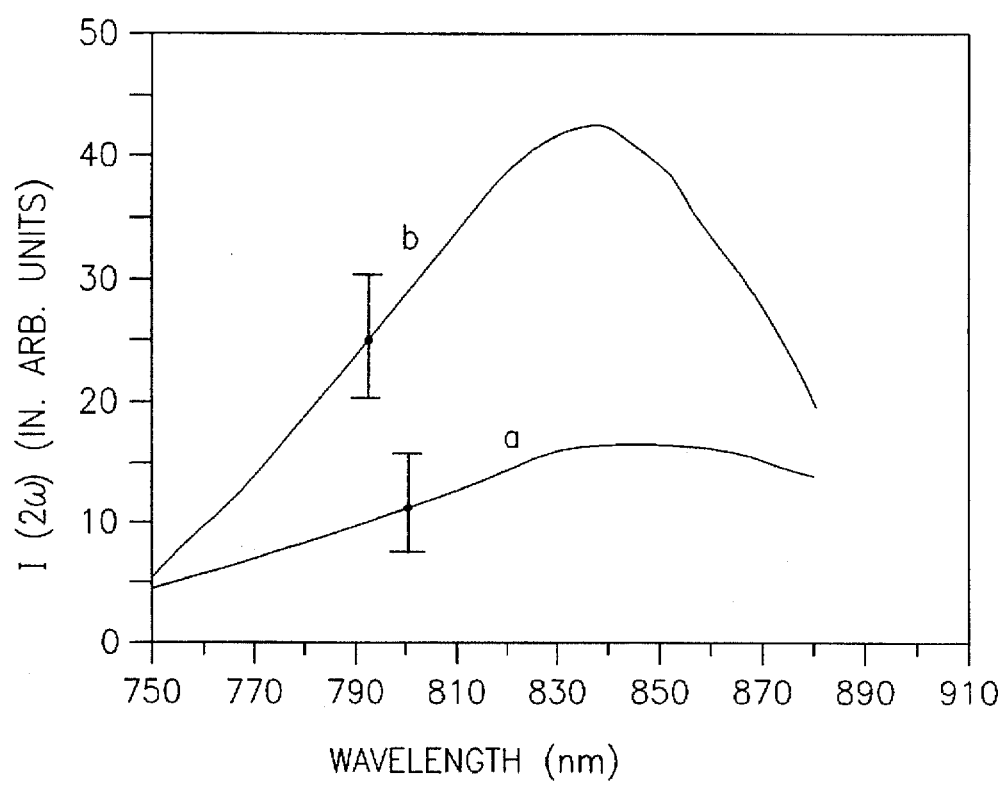
FIG. 3a is a graph showing the relationship between the conversion efficiency and pump wavelength for the crystal with micro domains only (curve a) and ordered plus micro domains (curve b)
Figure 3B:
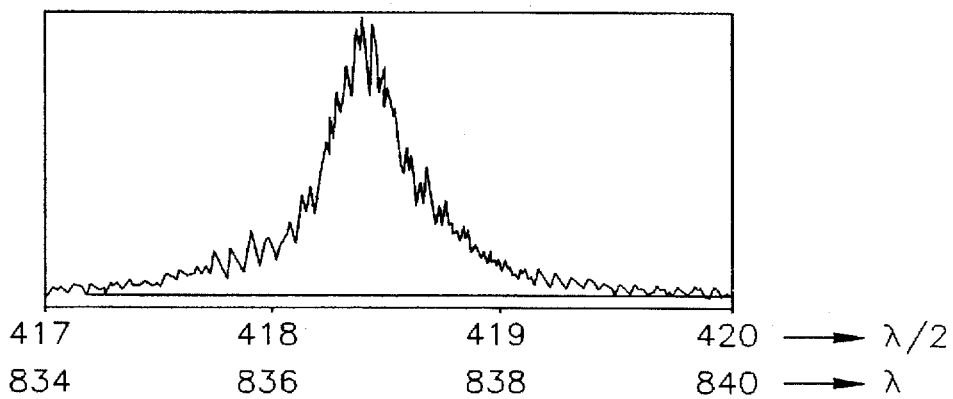
FIGS. 3b–e show, for several fixed grating wavelengths, the power of the second harmonic generation obtained experimentally as a function of the input and second harmonic wavelengths.
Figure 3C:
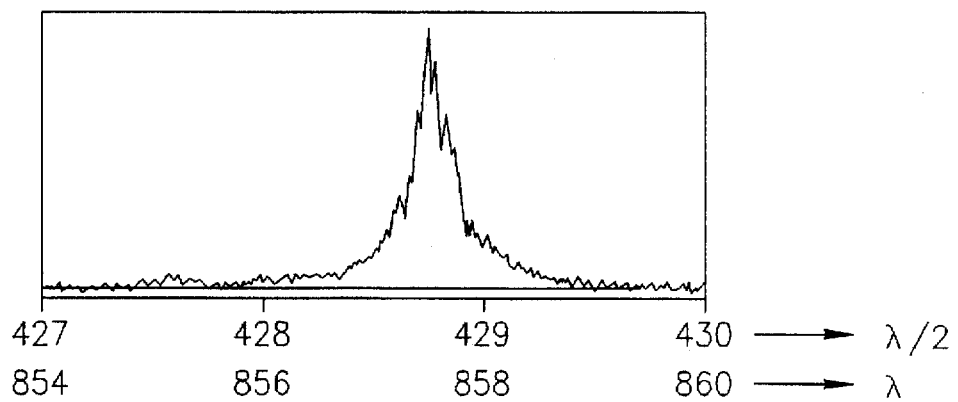
Figure 3D:
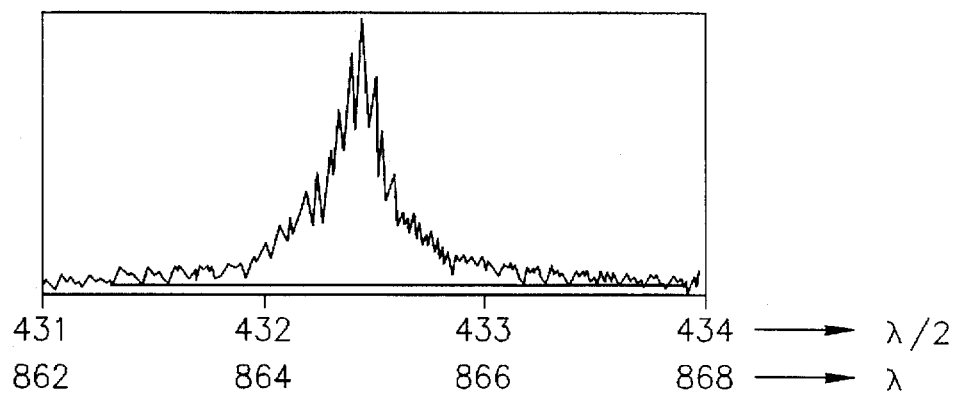
Figure 3E:
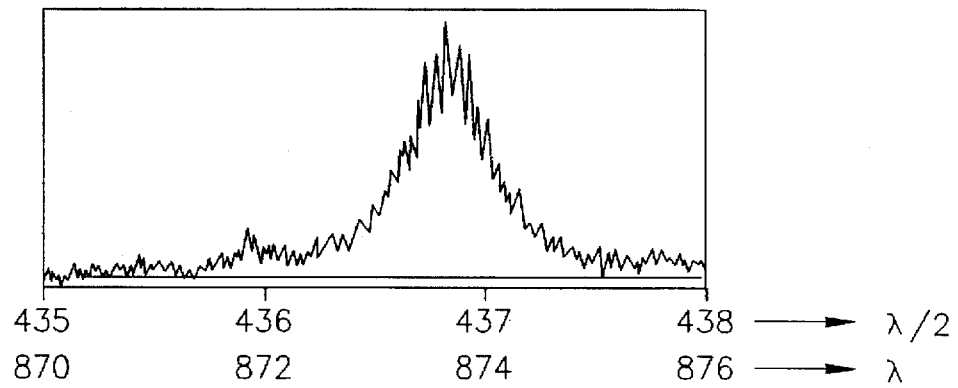

FIG. 3a shows the dependence of the conversion efficiency on the pump wavelength for the two cases of fixed crystals (random domains, with and without ordered domains). For input wavelengths below 800 nm, the second harmonic (400 nm) begins to lie inside the absorption band of crystal 24 and it is strongly attenuated. However, the technique can be applied to obtain SHG beyond the above range, especially for higher wavelengths, where attenuation is not a problem. The conversion efficiency was about 0.01% for an unfocused input beam, having a peak power of about 0.5 mJ and a beam diameter of 3 mm. However, with slight focusing of the input beam into crystal 24 with an input power of 3 mJ, conversion efficiencies of approximately 1% were obtained. No change in conversion efficiency was observed over a time period of 3 months in which the experiment was performed. Without use of the fixing method, no significant SHG was observed. This check was made in crystal 24 before the domain treatment, and also after the domains were erased.

The experimental results can provide more information on the SHG process. The directions of the beam's propagation, polarizations and the domains show that the significant nonlinear coefficients are $d_{31}$ and $d_{33}$. By measuring the intensities of the harmonic waves it is estimated that $d_{33}$ approximately $2d_{31}$. This fits the theoretical estimation presented in the book by Prokhorov et al., supra., wherein it can be estimated that for SBN with x=0.75, the nonlinear coefficients are $d_{33}$=12.8+/−3.6, and $d_{31}$=5.0+/−3.0, in units which are relative to $d_{36}$ of KDP.

The domains make up for the phase mismatch between the fundamental and the second harmonic waves, $\delta k = k_{2w} - 2k_w$, caused by an index difference (dispersion), which is $\Delta n \approx 0.19$ for the pump wavelength 830 nm. This necessitates a domain grating period of $\Lambda g = 2\pi/\delta k = \lambda_o/2\Delta n \approx 2.07$ um, where $\lambda_o$ is the vacuum input wavelength. However, for the results with broadband spectral response shown in FIG. 3a, it appears that there was spread quasi-phase matching. Such a mechanism was theoretically discussed in the paper by M. Nazarathy et al., Opt. Lett., 12, 823 (1987). In the experiment, this is provided by the random microdomains in the crystals. Their net effect is shown in the curve a of FIG. 3a, taken with the crystal that had only the microdomains.

The ordered domains, with their well-defined periodicity along the beam propagation direction, are responsible for the selective enhancement of a narrow spectral regime, as shown in curve b of FIG. 3a. These ordered domains also gave the enhanced peaks in the spread far field. The periodicity of the grating, which in this experiment was $\approx 2$ µm fits the enhanced response. The microdomains, having the broad width distribution in two dimensions, provided the phase matching for the continuous broad wavelength range and also the continuous angular deviation described above. Another important advantage of the spread phase matching is that it relaxes the usual strict demand for a precise direction and optimum shape of the pump beam in SHG. In trade for all these advantages, there is a degradation in the efficiency.

The same configuration can be used for narrow band SHG. However, in order to create ordered domains and prevent the formation of the pseudo-random microdomains that were a part of the process in the fixing experiment of FIG. 1b, an undoped crystal was used and it was illuminated by a wider layer (1 mm instead of 30 µm used in the former experiment for the micro domains—thus, pseudo-random microdomains, previously formed due to a non-uniform voltage drop in the illuminated light layer, are less likely to be induced). All other parts of the fixing process were as described earlier.

After poling crystal 24 with 2.5 kV for 5 minutes, the crystal was illuminated and an external voltage (V) was applied along the x-axis which had an opposite polarity to that used in the crystal poling. This voltage was gradually increased from 500V to 1100V over 10 seconds. Then, writing beams 25 were blocked and the polarity of the applied voltage was inverted. The voltage was increased from 400V to 700V in 5 seconds. Unlike the fixing process for holograms which was described above, the high voltage was applied to crystal 24 for an additional 3 minutes, and this allowed the domains to spread over the crystal. The size of the spreading is controllable by changing the duration of the last step. Then a confined volume can be obtained with applied electric field (to induce a refractive index change), and may be used for waveguiding the beams and increasing significantly the conversion efficiency of the second harmonic generation. The fixing could be erased by illuminating the crystal uniformly while applying high voltages (3 KV).

Figure 4:
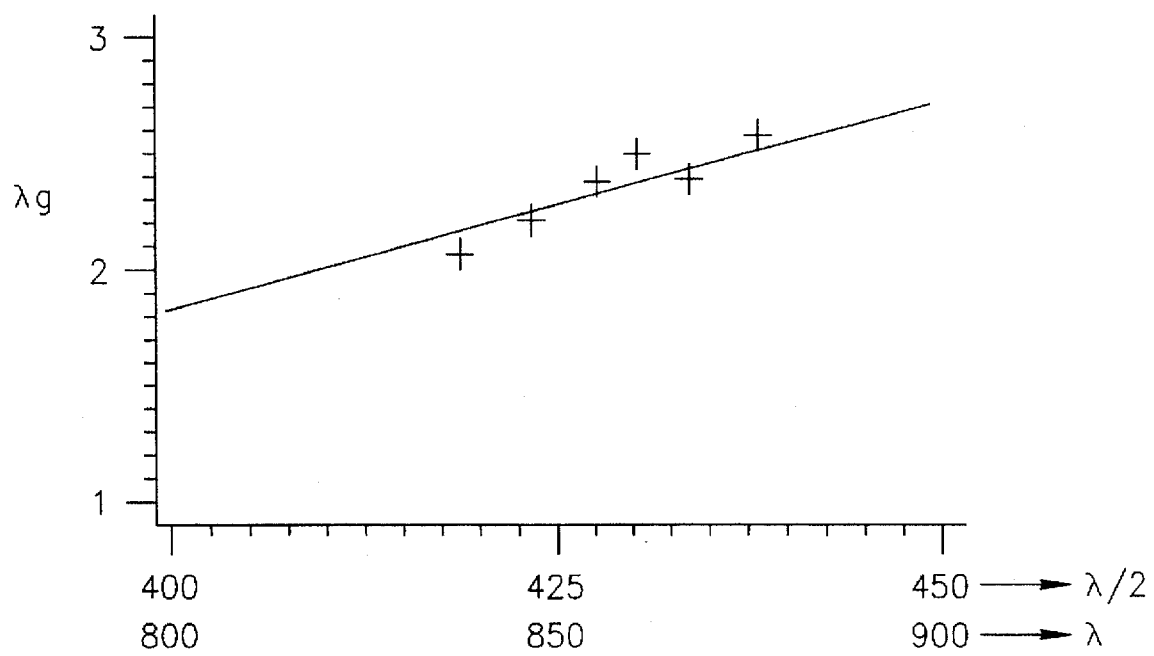
FIG. 4 shows a graph of the theoretical curve and experimental results of the periods of the domain grating needed to achieve quasi-phase matching as a function of the wavelength (in nm) of the input and second harmonic beams.

FIGS. 3b–e show the measured intensity of the SHG as a function of the fundamental and second harmonic wavelengths for four different fixed gratings. The peak powers were at input wavelengths λ=836.8 nm, 857.5 nm, 864.8 nm, and 873.7 nm, corresponding to second harmonic wavelengths 418.4 nm, 428.75 nm, 432.4 nm and 436.85 nm, respectively. The bandwidths of about 0.3 nm show a good periodic grating. After erasing the grating as described above, a null output was obtained. FIG. 4 shows the theoretical (according to the expression for $\lambda_g$, given above) and the experimental periods of the domain grating, needed for quasiphase matching (in SBN x=0.75), as a function of the wavelengths of the input and second harmonic beams. The wavelengths of the grating were approximately 2.0 to 2.5 µm. The experimental values correspond to the peak power of the second harmonic beam in each case.

The second harmonic beam has a confined profile, unlike the angular spread (in the direction perpendicular of the plane which contained the incident wave and the c-axis) in the spread spectrum case (broadband SHG) described earlier. The typical conversion efficiency was about 5% for the input beam energies mentioned above (pulses of 200–400 mJ having a duration of 10 nsec), where the beam had quite a distorted profile and a diameter of 1 mm, and the crystal had a length of only 3 mm. However, higher efficiencies are expected to be obtained after optimizing the input beam and the crystal qualities and by using confined geometries for high light intensities along longer distances.

Figure 3F:
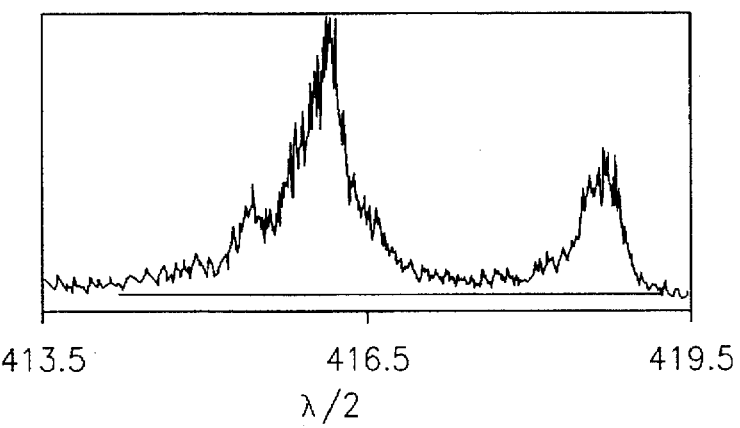
FIGS. 3f–g show graphs of experimental second harmonic generation output as a function of wavelengths ($\lambda$ and $\lambda/2$) with various tailored gratings for quasi-phase matching.
Figure 3G:
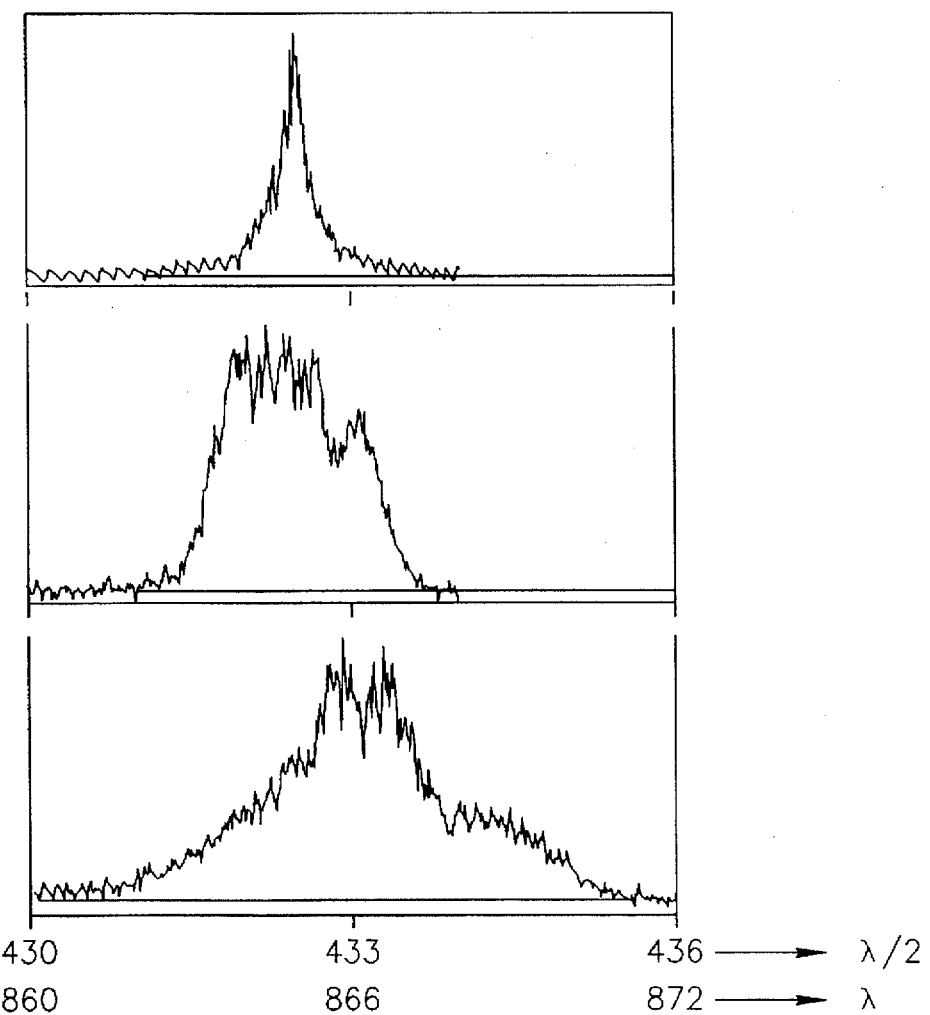

The multi-wavelength capability can be used to obtain quasi-phase matching for any prespecified wavelength range, discrete or continuous. It can be exactly tailored to a wavelength range of a tunable laser or to a large linewidth of a laser diode. The needed grating can be obtained simply by interfering light beams that induce the domain structure. For example, FIG. 3f shows the output where two different periodicities were induced in the crystal. The broadening capability of the wavelength acceptance range for SHG is shown in FIG. 3g. This was obtained by taking one of the gratings "writing" beams to be slightly spherical rather than a plane wave used in the narrow band case. The bandwidth was increased from 0.2 nm to 1.6 and 2.3 nm. This capability can make the method attractive for use with lasers which are not very stable or have relatively high linewidths such as laser diodes and short pulses. It is possible to induce other light patterns (as was described above for fixing of images and holograms) that may serve more complicated phase matching needs in the frequency or the spatial domains. Other possibilities include inducing and fixing curved gratings that spatially match non-uniform or complex laser sources.

The method of controllable narrowband SHG allows a flexible tailoring of quasi-phase matching to specific wavelengths, prespecified tuning ranges and frequency widths. This relaxes requirements on specific wavelength and narrow linewidth operation of second harmonic generation, and can be useful for frequency doubling of tunable lasers and laser diodes.

This same method also allows obtaining simultaneous generation of sum, difference and harmonics of two laser frequencies by spread spectrum phase-matching in nonlinear $Sr_{0.016}Ba_{0.39}Nb_2O_6$ crystal. The phase matching is obtained by inducing in the crystal domain gratings with broadband periodicity. Conversion efficiencies up to $\approx 1\%$ were observed.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

We claim:

1. A method for reversibly fixing optical images and holograms in a crystal having a predefined polarization, said method comprising the steps of:

projecting on the crystal a first input light pattern comprising an image or hologram having grating vectors which are substantially perpendicular to the ferroelectric polarization direction of the crystal, said image or hologram having interference fringe planes which are substantially parallel to said ferroelectric polarization direction;

applying, simultaneous with said projecting step, a voltage to the crystal along said polarization direction thereof, to induce an internal electric field pattern therein;

blocking said first input light pattern; and applying a second voltage with polarity opposite to said voltage, such that ferroelectric domains are induced with a modulation direction substantially perpendicular to said polarization direction to provide transverse domain gratings, and said first input light pattern is permanently fixed in said crystal until erased by application of an electric field thereto simultaneous with a second input light pattern.

2. The method of claim 1 wherein said induced electric field pattern and said induced domains are formed by screening of photo-ionized charges.

3. The method of claim 1 wherein said first input light pattern is a periodic function with a modulation direction perpendicular to the c-axis of the crystal, providing a transverse domain grating in the crystal.

4. The method of claim 1 wherein said simultaneous projecting and voltage application step is repeated for multiplexing with at least one additional input light pattern to induce at least one additional internal electric field and domain gratings, steps of blocking said additional input light pattern and applying a second, opposite voltage polarity being performed to permanently fix said additional multiplexed input light pattern.

5. The method of claim 1 wherein said simultaneous projecting and voltage application step, and said input light pattern blocking and opposite voltage polarity application steps are repeated for multiplexing with at least one additional input light pattern to induce at least one additional internal electric field and domain gratings, to permanently fix said additional multiplexed input light pattern.

6. The method of claim 1 wherein said projecting step is performed by projecting at least one of a pictorial information pattern such as a slide, mask, and multi-beam interference pattern such as a grating or hologram.

7. The method of claim 1 wherein said input light pattern is multiplexed by at least one of spatial, angular and wavelength variation.

8. The method of claim 1 wherein said first input light pattern contains a pictorial information pattern for storage by fixing.

9. The method of claim 1 wherein said induced domain gratings are used for quasi-phase matching in wave and frequency mixing.

10. The method of claim 9 wherein said wave mixing comprises at least one of second harmonic generation (SHG) and parametric frequency mixing of at least one input light beam.

11. The method of claim 10 wherein said input light beam has a spatially non-uniform and complex shape.

12. The method of claim 9 wherein controllable narrow-band and broadband frequency mixing is obtained by tailoring said domain gratings for at least one of pre-specified wavelengths, pre-specified frequency widths, and pre-specified spatial light patterns of said input light beam.

13. The method of claim 9 wherein an SBN crystal is used for obtaining SHG and parametric wave mixing.

14. The method of claim 1 wherein said induced domain gratings have well-defined grating periodicity used for quasi-phase matching in wave and frequency mixing.

15. The method of claim 1 wherein said induced domain grating are pseudo-random domain gratings used for broadband quasi-phase matching in wave and frequency mixing.

16. A method for reversibly fixing optical images and holograms in a crystal having a predefined polarization, said method comprising the steps of:

projecting on the crystal a first input light pattern comprising an image or hologram, wherein said first input light pattern has a modulation direction perpendicular to the ferroelectric polarization direction of the crystal;

applying, simultaneous with said projecting step, a voltage to the crystal along said polarization direction thereof, to induce an internal electric field pattern therein;

blocking said first input light pattern; and applying a second voltage with polarity opposite to said voltage, such that transverse ferroelectric domain gratings are induced in the crystal and said first input light pattern is permanently fixed in said crystal until erased by application of an electric field thereto simultaneous with a second input light pattern.

* * * * *